(12) United States Patent
Garner et al.

(10) Patent No.: US 6,961,918 B2
(45) Date of Patent: Nov. 1, 2005

(54) SYSTEM FOR INTELLECTUAL PROPERTY REUSE IN INTEGRATED CIRCUIT DESIGN

(76) Inventors: Robert E. Garner, 3456 Mulberry Creek Dr., Austin, TX (US) 78732; David N. Gardner, 2128 Woodston Dr., Round Rock, TX (US) 78681; Jeffrey Jussel, 9564 Indigo Brush Dr., Austin, TX (US) 78726; Anna Elman, 10703 Cassia Dr., Austin, TX (US) 78759; David Ling, 12714 Red Deer Pass, Austin, TX (US) 78729-6436; Alvaro Eduardo Benavides, 1306 Creekview Dr., Round Rock, TX (US) 78681; Mark A. McAdams, 5508 Lomita Cir., Plano, TX (US) 75023

( * ) Notice: Subject to any disclaimer, the term of this patent is extended or adjusted under 35 U.S.C. 154(b) by 792 days.

(21) Appl. No.: 09/888,332

(22) Filed: Jun. 21, 2001

(65) Prior Publication Data
US 2002/0019730 A1     Feb. 14, 2002

Related U.S. Application Data

(60) Provisional application No. 60/213,207, filed on Jun. 21, 2000.

(51) Int. Cl.[7] .............................................. G06F 17/50
(52) U.S. Cl. .................................. 716/18; 716/1; 716/2
(58) Field of Search ............................. 716/1, 2, 5, 18; 705/7, 14; 717/174

(56) References Cited

U.S. PATENT DOCUMENTS

| | | | |
|---|---|---|---|
| 6,134,539 A | 10/2000 | O'Conner et al. | ............ 706/45 |
| 6,519,571 B1 * | 2/2003 | Guheen et al. | ............... 705/14 |
| 6,606,744 B1 * | 8/2003 | Mikurak | ..................... 717/174 |
| 2004/0107125 A1 * | 6/2004 | Guheen et al. | ................ 705/7 |

* cited by examiner

*Primary Examiner*—Thuan Do
(74) *Attorney, Agent, or Firm*—Michael O. Scheinberg (57) ABSTRACT

The invention provides a knowledge management system particularly suited for use in the integrated circuit design environment. The system allows administrators to define standardized component types. Instantiated components versions comprise "deliverables" and "attributes." Deliverables comprise a file or directory of files or groups of files or directories that perform a common function and are characterized by the system in a standardized manner. Attributes comprise metadata describe the component version. By the abstraction of design files into deliverables, the systems can work with design files originating from any source and having different structures and still make those design files available by other designers in a uniform manner for efficient reuse of pre-qualified components. Tasks in the design flow can be tracked in the system. The system may also include a communications application, an issue tracking application, and an audit trail application.

29 Claims, 3 Drawing Sheets

FIG. 1

| Memory Component Type 202 ||
|---|---|
| DELIVERABLES 212 | ATTRIBUTES 214 |
| DESIGN DOCUMENT 204 | PHYSICAL SIZE 216 |
| USER GUIDE DOCUMENT 206 | SPEED 218 |
| RTL SOURCE CODE 208 | STORAGE SPACE 220 |
| TEST VECTOR 210 | |

SYSTEM FOR INTELLECTUAL PROPERTY REUSE IN INTEGRATED CIRCUIT DESIGN

RELATED APPLICATIONS

This application claims priority from U.S. Provisional Patent Application No. 60/213,207, entitled "System for Reuse in System-On-Chip Designs," filed Jun. 21, 2000, which is hereby incorporated by reference.

FIELD OF THE INVENTION

The invention relates to reusable circuit design components. More specifically, the invention relates to a system and method for creating and managing design components that can be readily inserted into circuit designs, including system-on-chip (SoC) designs.

BACKGROUND OF THE INVENTION

Integrated circuit design and manufacturing are incredibly complex operations. A circuit design, which begins as a functional description of circuit logic, must be converted into circuit components, such as transistors, resistors, capacitors, and connecting wires, formed from areas of conductors, semiconductors, and insulators on a semiconductor silicon die. Each of the steps in converting from logic to physical circuit must be verified to ensure that it properly implements the designed logic.

The physical circuit does not behave like ideal, theoretical components so a design that works as a model may not work when produced as a physical device. For example, the capacitance between adjacent conductors affects the circuit operation, as does the time required for electronic signals to move between elements in the circuit. Extensive testing and analysis is performed as the circuit logic is converted into a circuit design and then into physical circuits.

As the capability of integrated circuits (IC) fabrication processes advance, the number of transistors and logic gates that can be applied on a semiconductor chip increases exponentially. Current integrated circuits include tens of million of logic gates on a single chip. Companies are taking advantage of the latest silicon processes by combining within a single chip all the functions of a traditional system, including processors, digital signal processors (DSP), memory, and peripheral interfaces.

Moore's law states the computational power of computers, which depends on the number of features in an integrated circuit, doubles every eighteen months. This doubling is due fabrication advances that shrink the size of circuit features. One consequence of decreased feature sizes is that there is an ever-increasing amount of space available on the silicon die that can be used for circuitry. It is critical that design time be keep low so that new products can be brought to market as quickly as possible so there is no additional time available to fill the space. While the productivity of circuit designed is estimated to be increasing at about twenty percent a year, this is insufficient to take advantage of the available space on the chips in time to meet the market demand.

The number of designers is not growing. Designers are not able to keep up with the increased capacity of the chips. For example, many semiconductor houses have the silicon process complexity to put more than 20 million logic gates on a chip. However, the average application specific integrated circuit (ASIC) today includes roughly 500 thousand gates. It is widely recognized that a productivity gap exists between the capabilities of today's electronic design automation (EDA) tools and the number of gates available on a single die in the current silicon processes.

To overcome this gap, designers seek to create multi-million gate system-on-chip (SoC) designs by reusing existing pre-verified design blocks, referred to as intellectual property (IP), in a block-based methodology.

In the electronics industry the value of design reuse has been well understood for a long time. Even with this understanding, limited design reuse has been occurring so far. One barrier to design reuse is the technical challenges involved in sharing IP between design groups. A design is more than a single file. A design typically comprises a multitude of parts in different formats and created and edited by different tools. Although some individual design groups have created standardized directory formats for different file types, there has been no standards across the industry or even across most companies. When a design is provided to another designer, there has been no standardization regarding how the files are named or organized, so it can be difficult to determine where all the necessary files are located.

To complicate matters, the productivity issue driving design reuse is not only a design creation gap. It is also a design verification gap. The widespread use of synthesis allows designers to automatically generate logic circuits or gates from a description of the logic operations that are to be performed. It is necessary to verify that the output of the synthesis step produces the required logical results.

As designs change over time, the different files that make up the design may be revised. The changes in individual files result in version changes to the files. It is difficult to keep track of all the different versions of the multiple files to keep track of what files are currently used in a design.

For groups of engineers sharing design data, there are also issues like incompatible tools and lack of communication. Information, such as the version of the tool creating certain of the design files are not maintained. If one designer tries to use a design created by another designer, the difference in tools or versions of tools may introduce errors in reprocessing the files. If the original designers are not available to explain the design files, it can be impractical to re-engineer a legacy block from one technology to the next, and may be prohibitive.

Beyond the technical barriers to design reuse, there are also very real economic barriers to the initial adoption of design reuse. For example, a design manager may find it difficult to justify designing a new block for reuse while trying to maintain the SoC design schedule. The extra work required to make the design reusable uses up limited resources and jeopardizes the existing project. At the same time, the existing design group may never reuse this block, making the choice of designing for reuse one of known risk for uncertain reward. This barrier can only be overcome when the time saved reusing existing blocks in an SoC design more than makes up for the effort required to design new blocks in a usable manner.

Other barriers to design reuse are cultural in nature. Every engineering organization has its own design culture. Many engineers in that culture will prefer to create rather than verify, innovate rather than re-engineer. Additionally, traditional company incentive programs tend to reward the designer for innovation. Design reuse, however, requires that design creation and innovation be moved up a level of abstraction.

Even within a given organization, designers attempting to reuse will find incompatible deliverable formats, mismatched block interfaces, incomplete documentation and inconsistent tool flows. Moreover, in many cases, there is no clear definition of what it means for a block to be reusable. To further complicate matters, the definition of "reusable" differs between designers, organizations and design requirements. Additionally, with growing chip complexity, functional verification is also a formidable barrier to design reuse. If a designer must be intimately familiar with the minutiae of a component in order to verify that block, then little time is saved in design reuse.

SUMMARY OF THE INVENTION

An object of the invention to provide a system to facilitate reuse of IP by circuit designers.

The present system provides a design environment that uses standardized component types and the concept of "deliverables." Deliverables comprise a file or directory of files or groups of files or directories that perform a common function and are characterized by the system in a standardized manner. By the abstraction of design files into deliverables, the systems can work with design files originating from any source and having different structures and still make those design files available by other designers in a uniform manner for efficient reuse of pre-qualified components.

Components comprise "deliverables" and "attributes." Attributes are metadata that describe the component, including its deliverables. Metadata are stored in a database separate from the deliverables. The metadata include for most components, the type of component, the version, and the level of qualification of the component.

Standard component types are defined. Each component in the system is of a standardized type. The attributes, deliverables, and qualification standards for each type of component are controlled in the system. Thus, a designer wishing to reuse a component can be assured that the component is uniformly characterized with regard to its attributes and its qualifications. The object-oriented aspect of defining component types and then instantiating components provides an scalable system in which it is easy to create instances versions and associations of objects. While the system provides a standard framework for designers, it is flexible in that new component types, standards, attributes, and deliverables can be readily defined and added to the system by the system administrators.

By using the abstract concept of a standardized "deliverable" and characterizing each deliverable using metadata in a database separate from the design file, applicants are able to provide a system that manages a large number of different types of design files in an efficient manner that allows other designers to understand and reuse the files.

The use of the deliverables concept allows the system to provide a hierarchical configuration management by maintaining a hierarchy of components and provides version control that provides for versions for each deliverable and subcomponent of a component as well as a single version for the component itself. The combination of the component model and the data structure of design files and metadata files produces a knowledge management system that is suitable for managing an extensive knowledge base.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Embodiments of the invention may be best understood by referring to the following description and accompanying drawings which illustrate such embodiments. In the drawings.

DETAILED DESCRIPTION

A system for creating and managing reusable IP designs and using the IP in other IP and in system-on-chips designs is described. In the following description, for purposes of explanation, numerous specific details are set forth in order to provide a thorough understanding of the present invention. It will be evident, however, to one skilled in the art that the present invention may be practiced without these specific details.

To facilitate understanding of the invention, applicants first define terminology and describe certain aspects of the invention in more detail.

Definitions, Concepts, and Structure

Intellectual Property (IP)

The commonly used term IP represents a particular reusable design block such as a CPU, a timer, or a complete SoC. The invention can support more than just IP components; it can be configured to store virtually any type of component.

Component

The term "component" is used to mean a reusable design block typically supported by both meta data and design data files. A component, while typically a reusable block of circuit design, could actually be anything, for example, software or a plastic case for a housing. The meta data allows the user to specify information, such as simple attributes, about a component that is not otherwise stored in one of its design data files. Component information stored as meta data allows the component to be searchable by that meta data.

Each component is defined to be of a particular "Component Type." All components of a particular component type are bound by the same standards set forth by that component type. This ensures consistency between each of the components, enhancing the user's ability to search and manage these components.

Component Attributes

Most of a component's meta data are attached in the form of the attributes. An attribute is defined as a "name:value" pair. For example: "gate count:100." Components can be searched based on their attribute values for particular attribute names. For instance, if there was an attributed name called "category," a user could find all CPU components by searching for all components with category=CPU. Attributes can be created by the system administrator to characterize any aspect of a component.

The standardization of attribute names supports repository-wide searches. In the prior art, different attributes names were used by different designers. For example, suppose some components used the attribute name "category" while others used "cat" and yet others used "grouping" to all represent the same idea. Because the designers were using different attribute names, it was not possible to search across components because there is no way to know how the attribute names are equivalent. In the inventive system, the attribute name must be chosen from a list of standard attribute names tied to the component's component type.

The standardization of attribute names is a significant benefit of the use component types. The creator of a component type can choose all the attribute names that components of the type must use. With the attribute name "category," for example, a user would simply choose this attribute name from a predetermined list and then enter the value, eliminating different attribute names, even as a result of data entry errors.

Component Deliverables

A deliverable is defined as a grouping of one or more design data files or directory of files that serve a common purpose. Deliverable can be, for example, documentation, RTL source code, a netlist, or synthesis constraints. Deliverables are the work product that is to be reused. Because the type and characterization of each deliverable is standardized by the system, the standardization of deliverables provides a common understanding between designers of what is being exchanged. Deliverables provide a powerful way to group files that are related to a particular part of the component design. For instance, if the user requires all RTL files for the design, he could simply request the RTL deliverable that contains all those files.

As the term deliverable implies, it represents the data unit intended to be delivered to other designers. Deliverables address the problems associated with exchanging design data, specifically between designers that have different standards for naming or structuring their design files.

A component can be composed of multiple deliverables where each deliverable is one from a standardized list of valid deliverable types as defined by the component type of the component. For example, suppose a user designs a component called "FastCPU" of the type "IP component," and the IP component type defines deliverable types such as RTL, Netlist, and Documentation. The designer of the FastCPU could create a deliverable of type RTL and place all its RTL files under that deliverable. Similarly, for netlist and documentation, in this example. Since all designers that create IP components adhere to the same set of deliverable standards, designers can efficiently exchange and reuse components.

The standardization of deliverable types has additional benefits: the development of qualification standards can be specific to those deliverable types and standard flows can be created based on those deliverable types.

Each deliverable is tied to only at most one component. That component can be used as a subcomponent in multiple components, but the deliverable itself is associated with the one component. Different versions of a component can be instantiated as subcomponents in different components. If a designer creates a new version of a deliverable, a new version of the component holding the deliverable may be created. Any design that used the previous version of the component does not change, but continues to use the previous version.

Component Types

A component type defines a set of standards to which all components of that type must conform. Those standards include are:

Attribute names
Deliverable Types
Deliverable Sets
Flow Templates
Qualification Standards Every component must be one of a predefined component type. Some types of component types are restricted. For example, a component type can be defined that does not have versions or that cannot instantiate subcomponents.

Design Hierarchy

In a typical design approach, a design component is partitioned into a number of sub-blocks. Each sub-block can itself be partitioned into sub-blocks. This is known as design hierarchy. A preferred system allows the user to instantiate components under other components, that is a component can have subcomponents. When a component is instantiated inside another component, it is given a unique instance name such that it can be uniquely identified among other instances of the same component.

Version Control

In a preferred embodiment, the first step in creating a component is to create a versionless representation of the component. This allows the system to reference the component irrespective to any version. Also, non-version related attributes can be assigned to the component. Non-version attributes will automatically be inherited by a created version of the component.

To actually begin design on a component, a version of the component must be created. In a preferred system, all design activities operate on a component version. This allows activity on two or more versions to occur at the same time. The term "component version" refers to a versioned instantiation of the component.

Component versions are not entirely independent—they can share data among themselves. For instance, some of the deliverables between two versions may be identical. If so, the two component versions simply make references to the same deliverable version.

The system assigns versions not only to components, but to deliverables and to files that comprise the deliverables. By assigning a version to the deliverable, the deliverable files can be treated as a unit, which makes it much easier for designers to see the configuration of the deliverable. File versions are typically not visible and not relevant to users of a component, who deal only with the abstracted "deliverable." The term "deliverable version" refers to a versioned instantiation of the deliverable.

Anatomy of a Component

A component represents a collection of both deliverables and versions of itself. A deliverable represents a collection of both files and versions of itself. A file simply represents a collection of versions of itself.

The versioning of a component's deliverables is maintained independently from the component's versions. Similarly, the versioning of a deliverable's files are performed independently from both deliverable and component versioning, although the designer deals with versions of deliverables, the versioning of files being a hidden, system function. The user of a component only deals with the standardized deliverable representation of the design files and not with the unstandardized files themselves. Thus, regardless of the origin or form of the files, they can be abstracted into a deliverable with which the system can work in a uniform manner.

Thus, the system provides a component hierarchy with version control and configuration management. The version is controlled for each level of the hierarchy as well as an overall component version for the component. The system is centered on the deliverable, which is the work product that is to be reused.

A version of a component is simply a unique set of references to deliverable versions. Likewise, a single file version can be referenced by any number of deliverable versions. This results in a high degree of storage efficiency since file versions do not need to be copied, only references to them are made.

The combination of managing hierarchy of components with version control of components provides hierarchical configuration management that facilitates reuse.

A component version can also contain references to other components or other component versions that have versions of deliverables. When a first component version references a second component version, the second component version can be thought of as a subcomponent of the first component.

For example, if a component called CPU contains deliverables RTL and Netlist, Version 1.1 of CPU could make reference to versions 1.1. of both RTL and Netlist deliverables. Versions 1.2 of CPU might keep references to the same version of RTL, but references versions 1.2 of Netlist. Finally, version 1.3 of the CPU references new versions of both the deliverables, version 1.2 of the RTL, and version 1.3 of Netlist. The same sort of references occurs between deliverables and their files. The CPU could also have subcomponents. A user is typically only be concerned with the version of the component itself, although the user may be concerned with the version of a subcomponent or a deliverable that makes up the component.

Data Organization

Having meta data and managing it with a database, such as an Oracle relational database, and coupling that with the component model describes above provides a knowledge management system.

As with any system that can contain a large number of objects, the ability to organize those objects is essential. Operating systems such as Unix or Windows use what is referred to as directories to provide a way of hierarchically structuring and organizing its files. The invention can provide the same method for organizing its users, teams, components, tasks, flows, etc., with what it calls domains. A domain can contain subdomains where each subdomain can itself contain subdomains, thus allowing a hierarchical structure of domains to be created. This is known as a domain tree.

The domain tree serves the purpose of not just organizing users, teams, components, etc., but also defines a way to uniquely identify each element in the system. Each IP component has a unique identifier based on its position in the domain tree. This is referred to as its fully qualified name. The fully qualified name is formed by starting at the very top of the domain tree and concatenating all domain names down to the component, inserting a period (.) between each domain name and between the last domain name and the component name.

Multi-site Data

One benefit of the invention is its ability to encourage company-wide collaboration and sharing. This often means that the system must span the globe and provide access to users spread all over the world.

This could be done with a single server machine, but the network response time for remote users could be painfully slow. To address this issue the system has an architecture that can support multiple servers, each located at a major site of the company. At regular intervals the servers synchronize their data among themselves. Each server then has a copy of all data entered into the system, wherever the data was originally entered. This process is known as database replication. The practical number of servers that can be supported will depend on the network capacity between the servers.

Although the databases of metadata are replicated throughout the system, the design files preferably are not. They reside in individual "vault servers" or "vaults." When a user request a deliverable, the system automatically locates it in its local vault. The actual location of the deliverable may be unknown to the user. The system does support making a local copy or cache of a design file to speed access. If another user request access to the file, and access for that user would be quicker using the cached copy, the system will automatically access the local cache, rather than the original.

Flows Tasks, Flow Templates, and Task Templates

The flow system aspect of some embodiments allows the design flow to be defined and tracked. The standard flow allows the users to create consistent, repeatable processes for designing or qualifying components, while still providing flexibility to make changes to the flow as needed during the design process. The flow system is two tiered, comprising flows and tasks. A task is a specific job having an input and an output and a flow is a series of task. A flow template defines a design process that is specific to a component type, but independent of any particular component. A flow template can instantiate another flow template or a task template. Flow templates are under version control. Providing standardized flow can ensure that components and deliverables entering the system meet standards.

System Function

Below are described the different functions performed by and within the system. The functions are generally listed by subject matter area. Users in different roles have access to different functions. For example, a design can use a qualification tool to qualify a component, but only a qualification administrator can create a new qualification requirement. In a preferred embodiment, all user and administration functions are accessed via an application that is built on an application programming interface (API) of enterprise java beans (EJBS) to access the database. The application represents a presentation layer that accesses the application server using the API. The EJBs are running on the application server and access the database on the database server. The invention is not restricted to any particular architecture. For example, other implementations of the presentation layer can be created independently of the EJBs.

Roles

The different function of the system can be divided for convenience among different types of users, each type of user assuming a specific "role." Three primary roles are system or platform administrators, standards administrators, and designers. Designers create new components and use previously created components stored on the system. The systems administrator is responsible for installing system databases; installing servers; managing users, teams, and domains of users; and assigning different authorizations users, teams, and domains. Domains are a group of users, typically at a common location. The standards administrator is responsible for setting up standard choices for the designers to use when creating components. For example, the standards administrator sets up a list of formats for the designer to chose when he specifies the format for a file. The standards administrator also defines standard component types, deliverable and flow templates.

Administrative functions entail setting up the databases and servers, as well as providing standards to which various parts of the system must comply to ensure that components created by one designer can be readily understood and used by other designers.

System Administration Functions

System administrative functions include organizing managing domains and teams, and granting rights to users. Platform administrative functions allow the system Design data are maintained in databases referred to as "vaults." Because design data files are typically extremely large, it is efficient to have these files reside on the site of the designer responsible for the file. If a file is also to be accessed at other locations, copies of design files can be cached at other locations to avoid lengthy downloads. The system administrator can create vaults and remove vaults.

Unit Administration

One function of the standards administrators is to define the measurement units that are permitted to describe various component attributes. For example, the units for the attribute of "gate width" may be "microns;" the units for frequency may be megahertz and the units for buswidth may be bits. By standardizing units, designers can properly interpret attributes of components created by other designers.

Format Administration

Another function of the standards administrator is standardizing the formats used for deliverables. Formats are used, for example, with process flow tools to determine which deliverables can be input or output from different tasks. For example, a format for a design file may be "Verilog version 1.1." A "synthesize" task may accept only valid design formats as input. The standards administrator can create new formats or new versions of existing formats and may remove formats. Designers are limited to using existing formats when entering components into the system, unless the designer has the standards administrator add a new format.

Tool Administration

To enable efficient task scripting and reproducible design flows, tool information must be tracked. Tools include design automation tools, simulation tools, verification tools, documentations tools, etc. Tools are logged into the system and then the tool information is tracked. The designer can then use the tools in defining tasks and flows and can track the tool that was used to create different deliverables.

Flow and Task Administration

The system also tracks the creation of new IP. The steps that are required to create the new IP are together referred to as a "flow." A flow is made up of tasks. The standards administrator can define a standard task that a designer can then put together to create a flow for a design. Common tasks include, for example, synthesis, RTL Coding, Static timing analysis, prototyping, creating a requirements specification, etc. The standards administrator specifies the format of the input and output of each task and whether multiple ones of a particular input or output are allowed. An external file, such as a synthesis script, can be uploaded into a task by a task administrator.

Deliverable Type Administration

The deliverable type administration functions add new deliverables to the system. The deliverable type administration functions is not typically accessed independently, but is accessed through other application such as the component type administrator or the flow administrator. Using the deliverable type administrator functions, the designer can create, delete, or edit deliverables.

Deliverable types are characterized by properties, such as a name, creator, and comments. In creating a deliverable, a format for that deliverable is selected. The format is selected from a table of formats available for that deliverable type as previously entered by an administrator using the formats administration functions described above.

A deliverable type is also characterized by attributes. Attributes are elected from a list of attributes available for that type of deliverable. For example, an attribute of an RTL file deliverable could be "gates." The attribute takes a value of the type "number" and the default value may be 10,000.

Component Type Functions

A component type is defined as a group of deliverables and information related to that group which forms a useful type of design, such as an IP or an SoC. The component type functions include administrative functions of defining component types and specifying their properties and user functions for creating instances of components of the define types.

A component type has properties, such as the name of the type, comments and creator information. The creator of the type defines the attributes that a component of that type will possess. Attributes include a name and a value, the value being further defined by a type of value (such as a number or a string), a default value, a list of valid values, a list of valid units, etc. and indication of whether the attribute is required from every component of that type and a description of the attribute. The user then defines the deliverables that are associated with components of that type. For convenience, users are allowed to group deliverables into sets. Sets are useful for refining the type of design being processed.

The use of component types is an object-oriented aspect of the system. Components can inherit properties depending on their type. Different types can turn on or off different aspects of the component model, such as versioning, associations, and instantiations.

Component types promote the ability to create standards so that components created under the component type follow a standard. The system provides flexibility by providing the ability to create component types. Thus, the system itself does not specify standards; it provides the users the tools to create system standards.

Component types can be organized in a hierarchical manner. For example, a component type can be defined that inherits the properties of a parent component type.

Flow Functions

The flow functions are used to create and edit design flows to control the work of creating components and deliverables, which are constructed from tasks as defined by the tasks functions. Flows can be hierarchical, that is, there can be flows that are included in other flows. Flows are made up of tasks. The user can assign deliverables to each task input or output. The task inputs and outputs and corresponding formats are defined for a task template and are inherited when the template is instantiated in a flow template. This allows users to select the deliverables for each task input or output based on the format from the deliverables set of the component type. Users can also connect the input and output of tasks.

Once flows for a component are defined, designers can indicate status of the flows as work progresses. For example, a flow can be designated as ready to execute, not ready to execute, in-progress, completed successfully, or completed with failure. Completed with failure means that all the tasks have been completed, but some of the output deliverables have not generated.

Users can be view a graphical depiction of a flow template indicating the dependencies of each task and deliverable. Tasks are shown with graphical icons that display dependencies to other tasks by showing input deliverables and output deliverables in a manner similar to a schematic or flow diagram. If all mandatory input deliverables for the task have been prepared and are put into the deliverable versioning system (DVS), the user can check out those deliverables to the project directory. At the same time the flow template will be checked out from the DVS.

After all the input deliverables and flow templates are checked out, the user can invoke the task. Tasks can have the same status described above with respect to flows, that is, not ready, ready, in progress, completed successfully, or completed with failure.

The task and task template include properties, such as name, run version, and the name of the user responsible for the task. The task template also includes as properties the name of the task template, the version of the task template and the creator of the template. A task set-up menu allows assigning input and output deliverables for a specific task. For example, the input deliverables for a synthesis task may include an RTL file, synthesis script file, and a constraint file, while the output deliverable may include a net list. The user can configure multiple tasks with different deliverables based on deliverable format or tool usage.

Qualification Standard Functions

Qualification functions include administrative functions for defining qualification standards and user functions for the designer to use to record the qualifications of deliverables or components.

Qualifications are typically associated with component types, but can be independent. When a user requests a list of qualification standards available for a component type, the database will be queried via enterprise java beans and will be displayed in a hierarchical tree mode. Standards can be released or unreleased. A released standard can be used to qualify a component, but an unreleased standard cannot. A standard can be removed but it cannot be changed back from released back to unreleased. A component may be qualified to a new version of a standard using the Component Management Functions. More than one version of a standard can be released, and a design manager must specify which version of a released standard is to be used to qualify a particular component. Standards are characterized by properties, which include the name and a description of the standard. The standard can also be defined as having qualification levels, such as alpha, beta, or production.

The qualification functions include a question builder function that allows an administrator to build a list of questions that the designer must answer to qualify his component to the standard. Questions can be characterized by an identifier, a question text, a correct answer to qualify, a level to which the question applies, and certain limitations on questions, such circumstances in which the question is not applicable. A optional search feature allows a standards administration to find and copy a question from other qualification standards.

A designer uses a qualification user tool to qualify a component in the system to a particular versions of a standard. The component type is displayed, along with a hierarchical tree of the deliverables that make up the selected component type. The user answers qualification questions about each of the deliverables. For example, for a component type SoC having an RTL code deliverable, a qualification question may be "Does the source compile without errors?" Qualification questions can also be references to a task instead of a deliverable.

Component Tool Functions

The component tools allows the users to edit information about the components. The component has properties, for example, a name, a type, a description, and historical information, such as creation and modification information. The component also has associated attributes. Each attribute has a name. Some attributes have values in units specified by the unit administration functions. Some attributes, such as "Gated Clocks" are flag based and have a check box to indicate whether that attribute applies to the component. Other attributes, such as "pinout" are selection based, and the user pulls down a menu to selection an appropriate value. Other attributes are value-based, and the user enters a number. Value based attributes are described in the units, such as microns or megahertz, specified by the unit administrator.

The user can also give permission for relative degrees of access to the component to different users or teams. For example, a user can have permission to read or write to a file and can have administrative privileges, that is, the ability to give permissions to other users. Permissions can be assigned to users or teams, and members of a team inherit the permissions of the team.

The component functions allow the creation of new versions of a component and removal of old versions. Revisions are usually numbered in sequential order and may use decimals for minor revisions.

The component version tool deliverable menu shows existing deliverables. Deliverable are created using the Deliverable Versioning System (DVS). Each deliverable associated with the component has a deliverable name and a deliverable version. When creating a new version of a component, a user can select an existing deliverable to use with the new revision. The user can also specify a previously defined set of deliverables. For example, a set of front end deliverables could include RTL source, test vectors, specification, test bench, simulation, etc. While a user can use the same deliverable in multiple versions of a component, the user cannot use the same deliverable in a different component. To use the deliverable in a different component, he would need to copy the deliverable to create a second deliverable with its own unique identification.

The user can also chose a subcomponent of a particular revision level for inclusion in the component version. The user can search for a particular component to be included. The user can also select a design flow version to correspond to the component version.

Communication Functions

Some embodiments of the invention include a communication system for communication between members of the design team. The communication system allows the organization to have coordinated communication to provide a cohesive design environment. Designers can configure, maintain, and receive intra-company communication about design events. A design event is an event related to a design as a result of some action taken by a user within the system. A design event, such as a new design release to the repository or a discovered bug, can automatically trigger a communication to other affected designers. A typical design event is "New Qualification Level Reached" for a component. A user can configure the system to notify him when such event happens by subscribing to events of interest to him. A user can also indicate that certain events will be published or automatically sent to other users. Users have personal inboxes to receive and review subscribed and published messages. There is also a public inbox in which messages sent to all system users can be viewed.

The communication system includes three sub applications: a communication administrator, communications set-up, and communication inbox. The communication administrator allows an administrator to configure the overall communications environment. The communication set-up allows each user to subscribe and publish messages based on events or profiles. A communication profile allows each user to configure certain frequently used properties for a subscription or publication and reuse them. The communication personal inbox allows users to read messages triggered by design events that the user subscribed to or was published to by the component owner. Also, the communication public inbox shows all global system messages.

Issue Tracking Functions

The purpose of the issue tracking system is to enable an organization to report various design issues, such as those related to a component and possibly to a deliverable system, and to record subsequent steps taken to resolve the design issue. These issues need to be reported to the general design community and may require other users to help resolve the issue. Within the system, "issues" are any discrepancy in design data that may impact quality, functionality, production worthiness, or reusability that require reporting to other users and resolution. The following information is tracked with regard to an issue: the type of object affected, that is, whether the issue regards a component, tool, flow, etc., the component type, name and version, a deliverable and its version, a title containing a brief description of the issue, a detailed description of the issue, a priority level for the issue, a status of the issue, e.g., pending, fix in progress, closed, reopened, the name of the person reporting the issue, the person assigned to be responsible for the issue, and general notes.

The issue tracking system includes two sub-applications: an issue administrator and an issue tracking application. The issue administrator allows an administrator to configure the overall issue tracking environment. The issue tracking application allows each user to submit issues and be assigned issues by other users.

Any user can add to the general notes, but only an administrator can configure the status, priority, or issue type. The current assignee of the issue can also change the status and either the originator or current assignee can reassign the issue. A history is maintained to track actions taken with respect to each issue.

Audit Trail Functions

The audit trails system allows an organization to track the origins of shared designs. The audit trail system allows designers to search for and discover common design elements (such as bugs) in reused designs by tracing their origins in terms of either hierarchy or ancestry. The designers can view the design history for re-tracing the sequence of events leading to creation of a new component. To accomplish this, the audit trail system is divided into the following sub-applications: design hierarchy, design ancestry, design progress and design usage. The design hierarchy application allows users to determine both which components have instantiated a given component and which components make up a given component. The design ancestry application allows users to determine the origin of a given component, i.e., which component was a given component baselined from or copied from, and which components have been based lined or copied to a new component. The design progress application is used to track the state of design progress and qualification level for a given component and its sub-components. Also, users can get design progress for a number of components based on user-specified search criteria. The design usage application allow users to track who is using a given component, which includes all copies and checked out components as well as instantiated components. Like other applications in the system, the audit trail application makes extensive use of enterprise java beans to communicate with the database repository.

Figure 1:
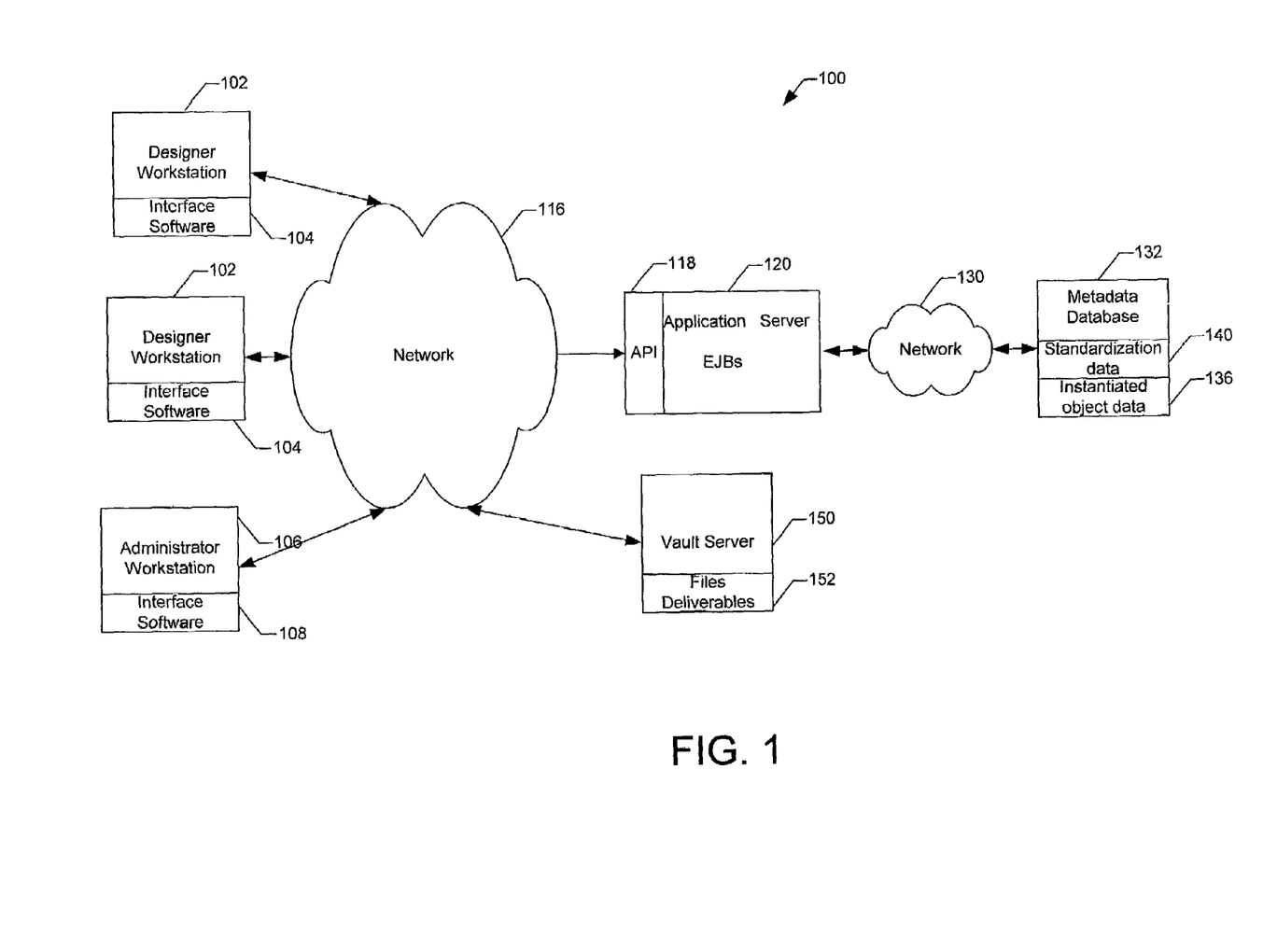
FIG. 1 is block diagram illustrating a system incorporating embodiments of the invention.

FIG. 1 is block diagram illustrating a system incorporating embodiments of the invention. FIG. 1 shows a system 100 that includes multiple designer workstations 102 that designers use to execute user interface software 104. System 100 also includes an administrator workstation 106 that executes a user interface program 108. Designer and administrator are roles, and the same individual can function as both designer and administrator, and the administrator workstation 106 can be the same physical computer as the designer workstation 102. The user interface programs 104 and 106 communicate through a network 116 and invoke functions of an application programming interface or API 118 in application server 120. The API functions use enterprise java beans or EJBs to access through network 130 a metadata database 132. Metadata database 132 includes data about instantiated objects 136, such as specific versions of components, and standardization data 140, such as data defining abstract component types and flow templates that structure and constrain the instantiation of objects. System 100 also includes a vault server 150 that stores deliverables 152 files. Files that are stored in the vault have associated metadata in the database. The metadata includes a unique identifier for each file version and version information. The deliverables are an abstract concept that is an object stored in the database which contains files that are stored in a vault server.

Figure 2:
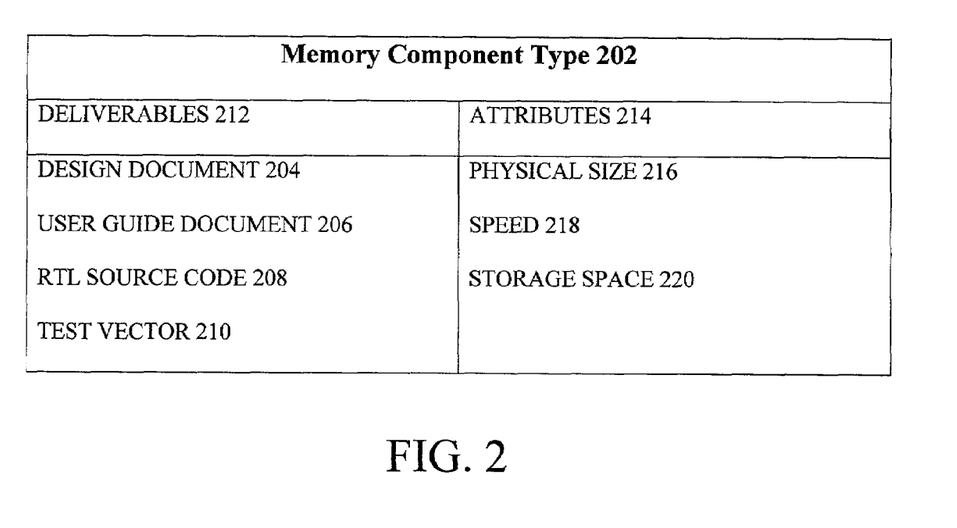
FIG. 2 illustrates a table of a component type for a memory, according to embodiments of the present invention.

FIG. 2 is an example of a component type for a memory, according to embodiments of the present invention. As shown, FIG. 2 illustrates memory component type 202 that includes deliverables 212 and attributes 214. Deliverables 212 for memory component type 202 include design document 204, user guide document 206, Register Transfer Level (RTL) source code 208 and test vectors 210. Attributes 214 for memory component type 202 include physical size 216, speed 218, and storage size 220. Accordingly, when a component of memory component type 202 is created or instantiated for storage within the database, the component will include the listed deliverables and attributes, shown in FIG. 2. The deliverables and attributes illustrated in FIG. 2 are by way of example and not by way of limitation, as other deliverables and attributes can be incorporated into different component types, according to embodiments of the present invention.

Figure 3:
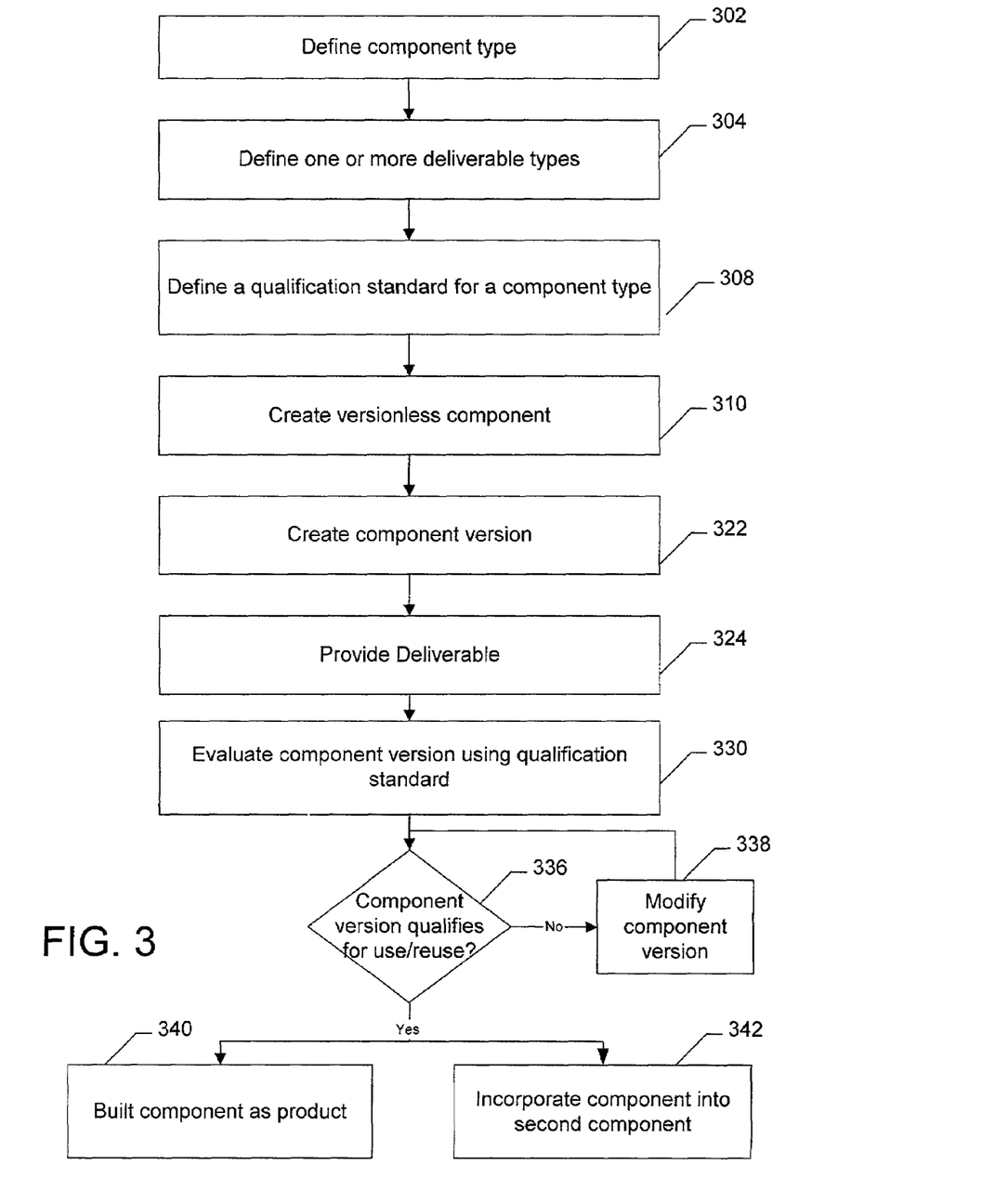
FIG. 3 illustrates a computer system that includes a machine-readable medium on which is stored a set of instructions according to embodiments of the present invention.

FIG. 3 is a flow chart showing the steps of a preferred embodiment of the invention. Step 302 shows that a component type is defined. As described above, a component type specifies attributes and deliverables for instantiate component versions of that type. Types, such as component types and deliverable types are created by administrators, not by designers. Of course, individual users may function in both the role of a designer and that of an administrator.

In step 304, one or more deliverable types are defined. As described above, a deliverable type will typically specify a format for the deliverable and required attributes of the deliverable. Deliverable types are created by users in an administrative role. In step 308, a qualification standard is defined for a component type. As described above, a qualification standard is associated with a component type and qualification standards are version controlled.

In step 310, a versionless component of the first component type is created. The versionless component is convenient for defining properties that will be the same for, and inherited by, all versions of the components. In step 322, a component version of the component type is created. In step 324, a deliverable associated with the component version is created, located, or purchased and stored in a vault server. In step 330, the component version is qualified using the qualification standard. If in step 336 the component is found to quality at an adequate level, the component can be freely used in production or in other designs. Note that a component can be an end product in itself, such as a SoC, or the component can be incorporated in other designs. In step 340, the component is produced as a product. In step 342, the component version is incorporated into the hierarchy of a second component version of the same or of a different second component type.

If in step 336 the component version is found not to qualify, the deliverables of the component version are modified until the component version can qualify. If the changes to the deliverables are significant, the designer begins again at step 322 and creates a new component version to provide enhanced ability to track the changes in the component. FIG. 3 is a simplified flow, and there are many other options that are explained above, but not included in the flow chart. For example, there may be multiple levels of qualification for a component, with each component version moving through several levels before it is available to be incorporate into other components versions.

A preferred tool for integration of components is described in more detail below in pending U.S. provisional patent application titled "Method and Apparatus for Socket-Based Design for Reusable IP," Ser. No. 60/139,146, filed Jun. 14, 1999 and U.S. patent application titled "Method and Apparatus for Socket-Based Design for Reusable IP," Ser. No. 09/540,784, filed Mar. 31, 2000, both of which are hereby incorporated by reference.

As illustrated, embodiments of the present invention provide a data deliverable-centric methodology for facilitating IP design reuse. Additionally, embodiments of the present invention provide a system and structure for the IP consumer to use the IP deliverables. Embodiments of the present invention are described in terms of electronic IP and SoC designs. However, embodiments of the present invention are not so limited, as such embodiments can be incorporated into other fields. For example, embodiments of the present invention can be incorporated into software components.

Although the invention is described with respect to an environment for circuit design, the invention is in fact a system for knowledge management that can be used in many fields outside of circuit design.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented system for designing integrated circuits using reusable design components comprising:

multiple component type definitions corresponding to different types of reusable integrated circuit design components, the component type definitions including attributes associated with the component type;

multiple components, each component being of one of the component types;

multiple component versions for each of the multiple components, each component version being of one of the component, at least one of the component versions including;

metadata including a component version number for tracking different versions of the component and attributes values describing attributes of the component; and a deliverable version including one or more integrated circuit design files performing a common function and having described by deliverable version number.

2. The system of claim 1 further comprising metadata associating the deliverable version number with the component version number.

3. The system of claim 1 in which the metadata corresponding to the component versions are stored in a database different from the database in which the deliverable files are stored.

4. The system of claim 3 further comprising an application server through which the user accesses the database to create and modify the metadata database.

5. The system of claim 1 further comprising multiple deliverable type definitions corresponding to different types of deliverables.

6. The system of claim 5 in which at least one of the deliverable types having associated qualification requirements defining requirements to qualify deliverable versions of that type to a qualification level.

7. The system of claim 6 in which at least one of the deliverable types have multiple associated qualification requirements defining requirements to qualify deliverable versions of that type to multiple qualification levels.

8. The system of claim 1 further comprising a design flow template associated with the component type, the design flow template specifying design tasks for designing a component of the component type.

9. The system of claim 8 further comprising a design flow version that is an instantiation of the design flow template and that correspond to the component version.

10. The system of claim 1 further comprising information for tracking design problems connected with the component version, the information including a person responsible far fixing each problem and the steps taken or required to be taken to fix each problem.

11. The system of claim 1 in which at least one of the component versions instantiates a second component version of a second component type, the second component version including at least one second deliverable version.

12. The system of claim 11 in which the component type corresponds to a system on a chip.

13. The system of claim 12 in which the second component type corresponds to a reusable design block.

14. The system of claim 1 further comprising users names, at least some of the users names are grouped into teams.

15. The system of claim 14 in which the users and teams have selectively controllable access to create, view or change components and to grant other users the right to create, view or change components.

16. The system of claim 14 in which the users and teams have selectively controllable access to create, view or change component versions and to grant other users the right to create, view or change component versions.

17. The system of claim 16 in which access to create, view or change component versions and to grant other users the right to create, view or change component versions is inherited from a team to its members.

18. The system of claim 1 further comprising a communications system in which a user can a specify a type of design event of interest and the user is automatically notified of the occurrence of design events of that type or in which a user can specify that other users to be notified of the occurrence of a design event.

19. The system of claim 18 in which the design event is a qualification of a component version.

20. The system of claim 18 in which the communications system includes a public mailboxes to receive information of public interest and private mail boxes associated with individual users to receive design event information which the individual user has request or that another individual user has request be sent to the first individual user.

21. The system of claim 1 further comprising metadata describing the origins of the component version, the origin metadata including ancestry and hierarchy information to allow for tracking of shared design information.

22. The system of claim 1 in which the deliverable includes logic to be implemented into an integrated circuit.

23. The system of claim 1 in which the deliverable version includes a file containing synthesis constraints.

24. The system of claim 1 in which the deliverable version includes a file containing RTL source code, test vectors, or a net list.

25. The system of claim 1 in which the component type includes a memory component, a CPU, a timer, or a SoC.

26. A method of designing integrate circuits comprising:
defining deliverable types;
defining a first integrated circuit design component type including specifying attributes and ones of the deliverable types to be associate with components of the first component type;
defining qualification standards associated with the first component type;
defining qualification questions associated with the deliverable types;
creating a first component of the first component type;
creating a first component version of the first component;
creating a deliverable version of the deliverable types associated with the first component type;
qualifying the deliverable version; and
qualifying the first component version.

27. The method of claim 26 further comprising:
defining a second component type including specifying attributes and ones of the
deliverable types to be associate with components of the second component type;
defining qualification standards associated with the second component type;
creating a component version of the second component type; and
instantiating the first component version as pan of the second component version, thereby reusing the first component version.

28. The method of claim 27 further comprising maintaining information in connection with the second component tat describes the hierarchy of the first component.

29. The method of claim 26 further comprising creating a flow comprising a task list associated with the creating a deliverable version of the deliverable type, the task list showing the required input and output of each task where each input and output is associated with a deliverable type.

* * * * *